US012731148B2

(12) United States Patent
Kupiszowski et al.

(10) Patent No.: US 12,731,148 B2
(45) Date of Patent: Sep. 8, 2026

(54) CRYPTOCURRENCY WALLET WITH RISK ATTRIBUTION

(71) Applicant: MASTERCARD INTERNATIONAL INCORPORATED, Purchase, NY (US)

(72) Inventors: Arkadiusz Kupiszowski, Ballymoney (IE); Damien Conroy, Dublin (IE); Deepthy Muraleedharan, Dublin (IE); Grzegorz Smorag, Dublin (IE); Rob Levin, Leander, TX (US); Alan Moran, Glynn (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 19/008,532

(22) Filed: Jan. 2, 2025

(65) Prior Publication Data

US 2025/0217810 A1 Jul. 3, 2025

Related U.S. Application Data

(60) Provisional application No. 63/617,412, filed on Jan. 3, 2024.

(51) Int. Cl.
*G06Q 20/40* (2012.01)
*G06Q 20/36* (2012.01)

(52) U.S. Cl.
CPC ..... *G06Q 20/4016* (2013.01); *G06Q 20/3678* (2013.01); *G06Q 20/407* (2013.01); *G06Q 2220/10* (2013.01)

(58) Field of Classification Search
CPC ........... G06Q 20/4016; G06Q 20/3678; G06Q 20/407
See application file for complete search history.

(56) References Cited

U.S. PATENT DOCUMENTS 10,275,772 B2 4/2019 Ronca et al.
10,904,266 B1 * 1/2021 Greevy ............... H04L 63/0236
(Continued)

FOREIGN PATENT DOCUMENTS

WO 2020106638 A1 5/2020

OTHER PUBLICATIONS

Lee, Kang Ha, "International Search Report & Written Opinion", International Application No. PCT/US2024/060912, mailed Mar. 31, 2025, 11 pages.

*Primary Examiner* — Scott C Anderson
(74) *Attorney, Agent, or Firm* — Barta Jones, PLLC

(57) ABSTRACT

A computerized system and method for securing a cryptocurrency wallet is provided. A transaction proposed by a user of a cryptocurrency wallet is intercepted and an address of counterparty is extracted from the transaction. If the address of the counterparty matches with an address in an allow list, a risk score is displayed for the proposed transaction. In response to displaying the risk score, an indication whether to submit or abort the proposed transaction may be received. If the indication is to submit the proposed transaction, the transaction is submitted. If the indication is to abort the proposed transaction, the transaction is aborted. In some examples, the indication to submit or abort the proposed transaction may be automatically generated based on machine learning from user behavior with earlier transactions with similar risk scores.

20 Claims, 15 Drawing Sheets

(56) References Cited

U.S. PATENT DOCUMENTS

| | | | | |
|---|---|---|---|---|
| 2015/0324764 | A1* | 11/2015 | Van Rooyen | G06Q 20/02<br>705/69 |
| 2018/0181962 | A1* | 6/2018 | Barnhardt | G06Q 20/4016 |
| 2018/0240107 | A1 | 8/2018 | Andrade | |
| 2020/0067861 | A1* | 2/2020 | Leddy | G06F 21/6245 |
| 2021/0065193 | A1* | 3/2021 | Kang | G06Q 20/389 |
| 2022/0101326 | A1 | 3/2022 | Kim et al. | |
| 2022/0253952 | A1 | 8/2022 | Jevans et al. | |
| 2023/0006976 | A1* | 1/2023 | Jakobsson | H04L 63/10 |
| 2023/0055618 | A1* | 2/2023 | Jakobsson | G06F 3/04817 |
| 2023/0088840 | A1* | 3/2023 | Rudraraju | G06Q 20/4016<br>705/43 |
| 2023/0145040 | A1* | 5/2023 | Shuster | G06F 16/9554<br>707/736 |

* cited by examiner

300B

Allow List (6)

Success
New allow list has been added successfully X

| ADDRESS | OWNER | COUNTRY | OWNER URL | ADDED ON | DESCRIPTION |
|---|---|---|---|---|---|
| 0xd551234ae421e3bc… | Exchange2 | CountryA | exchange2.com | 13/09/2023, 21:11:17 | My approved address and owner |
| 0xD551234Ae421e3B… | Exchange3 | CountryB | exchange3.com | 13/09/2023, 20:17:03 | |
| 0x56b8bf38cc2fcba56… | Exchange4 | CountryC | exchange4.com | 13/09/2023, 19:35:49 | Low risk example |
| 0x74de5d4fcbf63e002… | Exchange5 | CountryD | exchange5.com | 13/09/2023, 19:35:15 | Medium risk example |
| 0x108ec1e67a504446… | Exchange6 | CountryE | exchange6.com | 13/09/2023, 19:34:39 | High risk example |
| 0x2FC93484614a34f2… | Exchange7 | CountryA | exchange7.com | 13/09/2023, 19:33:29 | Sanctioned example |

Transfer Details X

| | |
|---|---|
| TRANSFER STATUS | **COMPLETED** |
| ID | 0xf23a08164608d20f3e...900ff54d7b551b91a1dc |
| DATE/TIME | 13/09/2023, 22:12:29 (15 seconds ago) |
| DIRECTION | SENT |
| CLIENT | hackathon1694639549338 |
| NETWORK | ETHERIUM |
| FIAT EXCHANGE RATE | - |
| CLIENT ADDRESSES | **0x4bf1c1095669374dd12346d51f5e3324cf99c065** |
| COUNTERPARTY ADDRESS | **0x108ec1c67a504441234d68dcd25fa5740d6e5cb** |
| **AMOUNT** | **20 ETH** |

FIG. 3G

CRYPTOCURRENCY WALLET WITH RISK ATTRIBUTION

BACKGROUND

The proliferation of cryptocurrency as a medium for digital transactions has introduced new opportunities as well as challenges for financial security. Cryptocurrency wallets, which enable users to store, manage, and transact with digital currencies, are a critical component of the cryptocurrency ecosystem. However, the decentralized and pseudonymous nature of cryptocurrency transactions also makes them particularly vulnerable to fraud, hacking, and other malicious activities. A key concern of cryptocurrency transactions is the unauthorized or inadvertent initiation of the transactions to unknown or malicious counterparties. Unlike traditional financial systems where fraud detection and prevention mechanisms are centralized, cryptocurrency transactions are generally irreversible. The known systems fail to preemptively ensure the validity and security of cryptocurrency transactions in real-time particularly when the address of a counterparty to which a payment is to be made is in an allow list of addresses. This allow list may be exploited by fraudsters in known systems for making fraudulent transactions resulting in financial loss as well as loss of computing and network resources in processing fraudulent transactions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method for securing a cryptocurrency wallet are provided. A transaction proposed by a user of a cryptocurrency wallet is intercepted using an interface of the cryptocurrency wallet of the user. An address of a counterparty to which a payment is to be made from the cryptocurrency wallet is extracted from the proposed transaction. The address of the counterparty is compared with a plurality of addresses in an allow list that includes addresses which are allowed for transactions using the cryptocurrency wallet. Based on the comparison, if it is determined that the address of the counterparty is not in the allow list, the proposed transaction is blocked. Based on the comparison, if it is determined that the address of the counterparty is in the allow list, a risk score for the proposed transaction is displayed to the user. In response to the display of the risk score, an indication is received whether to submit or abort the proposed transaction. If the received indication is to submit the proposed transaction, an alert is generated that the risk score has been ignored. If the received indication is to abort the proposed transaction, the proposed transaction is aborted.

BRIEF DESCRIPTION OF THE DRAWINGS

The present description will be better understood from the following detailed description read considering the accompanying drawings, wherein:

FIG. 3B is an example screenshot showing adding of a new allow list;

FIG. 3G is an example screenshot showing transfer details of a completed transaction;

Corresponding reference characters indicate corresponding parts throughout the drawings. In FIGS. 1 to 5, the systems are illustrated as schematic drawings. The drawings may not be to scale. Any of the figures may be combined into a single example or embodiment.

DETAILED DESCRIPTION

Figure 1:
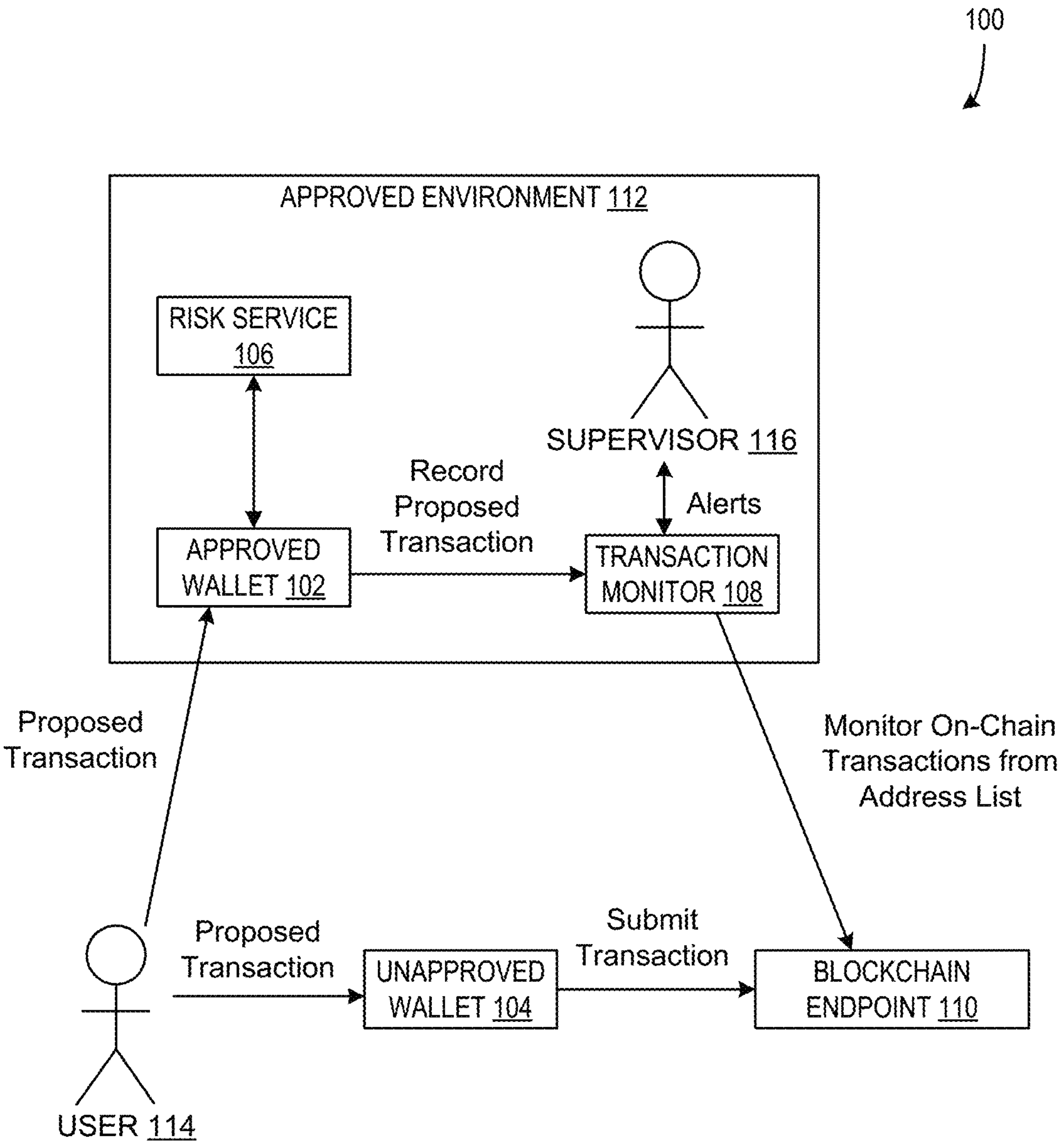
FIG. 1 is a block diagram illustrating an example system for securing a cryptocurrency wallet.

The increasing adoption of cryptocurrencies necessitates robust security protocols and compliance measures. Address poisoning is one of the methods where scammers send transactions of little to no value to user's wallet using addresses that look similar to something they have used in the past, hoping that the victim will use the scammer's address in the future. Existing wallets lack real-time, preemptive risk assessment and do not provide sufficient tools for organizations to enforce their internal compliance policies.

Examples of the disclosure implement a secured and safer cryptocurrency wallet that addresses these shortcomings and more by introducing a real-time address screening system, organizational rule management, and continuous monitoring of blockchain transactions, thus mitigating risk and enhancing compliance. The cryptocurrency wallet has advanced security features that proactively screen transaction addresses against risk and sanctions, ensure adherence to organizational rules customizable through an administrative interface, and implement continuous monitoring to identify and alert on unauthorized transactions.

The cryptocurrency wallet enhances security and compliance within cryptocurrency transactions. Before any transaction is processed, the cryptocurrency wallet evaluates the destination address to ensure it is not associated with any known risks or sanctions. This proactive measure helps prevent transactions with potentially risky or non-compliant parties. Additionally, the wallet checks against a set of organizational rules, which are established and managed through an administrative user interface (UI). The administrative UI allows administrators to define and modify the compliance parameters for setting up what is allowed and what is not within their organizational framework. The administrative UI also enables the compliance team to set up alerts for transactions that require review based on these rules.

Continuous monitoring is another feature of some examples. It constantly oversees all organizational blockchain addresses, even checking for any transactions that occur outside of the software wallet. If such activity is detected, examples of the disclosure trigger alerts to notify the administrator or supervisor of the organization, thereby allowing for swift action and maintaining a secure transaction environment. This ensures that even transactions not initiated through the wallet are subject to scrutiny and oversight, reinforcing the organization's security and compliance posture.

Examples of the disclosure implement a computerized method for securing a cryptocurrency wallet. A transaction proposed by a user of a cryptocurrency wallet is intercepted and an address of a counterparty to which a payment is to be made from the cryptocurrency wallet is extracted. The address of the counterparty is compared with a plurality of addresses in an allow list that includes addresses which are allowed for transactions using the cryptocurrency wallet. In some examples, the comparison includes performing a fuzzy matching of the address of the counterparty with the addresses in the allow list. Based on the fuzzy matching, if it is determined that the address of the counterparty matches more than a threshold percentage (e.g., more than 50% match) with one or more of the plurality of addresses in the allow list that have been used for transactions in past, the address of the counterparty is determined to be in the allow list.

Based on the comparison, if it is determined that the address of the counterparty is not in the allow list, the proposed transaction is blocked. Based on the comparison, if it is determined that the address of the counterparty is in the allow list, a risk score for the proposed transaction is displayed to the user. In response to the displayed risk score, an indication may be received whether to submit or abort the proposed transaction. If the received indication is to submit the proposed transaction, an alert may be generated that the risk score has been ignored. The alert may be sent to the user and/or the administrator (e.g., supervisor) of the organization of which the user is a member. The allow list may be created by the administrator of the organization.

In some examples, the process of initiating an action on the displayed risk score is automated. For example, data on an interaction history of the user based on a plurality of risk scores is collected. The collected data includes an action taken by the user for at least a threshold percentage of the plurality of risk scores (e.g., more than 90% for a risk score of 8 and above, more than 70% for a risk score of 6-8, etc. where the risk score is on a scale of 1 to 10 in an increasing order of risk score). An interaction model may be trained based on the collected data on the interaction history of the user. The trained interaction model may be used to automatically initiate an action for the displayed risk score, wherein the action comprises automatically receiving the indication to submit or abort the proposed transaction without any input from the user on the displayed risk score.

In some examples, a risk attribution application that includes the allow list is plugged into a cryptocurrency wallet application having the cryptocurrency wallet of the user. The risk attribution application is accessible via a hook, or interface, into the cryptocurrency wallet application. The risk attribution application may be provided by a first entity different from a second entity providing the cryptocurrency wallet application.

FIG. 1 is a block diagram illustrating an example system 100 for securing a cryptocurrency wallet. A user 114 may initiate a proposed transaction to an unapproved wallet 104. This proposed transaction may be intercepted by an approved wallet 102 in an approved environment 112. In some examples, the approved wallet 102 extracts the addresses from the proposed transaction and sends to a risk service 106 which determines a risk score for the addresses. The risk score may be determined by an on-chain, real-time, risk analysis. The risk service 106 returns the risk score to the approved wallet 102. In some examples, the approved wallet 102 sends the proposed transaction to the risk service 106 which extracts the addresses from the proposed transaction and determines a risk score for the addresses extracted from the transaction. In some examples, the risk score for the addresses may be aggregated to determine a cumulative risk score for the transaction.

In some examples, the approved wallet 102 may provide the proposed transaction along with the risk score (for the addresses and/or the transaction) to a transaction monitor 108. The transaction monitor 108 records the proposed transaction along with the risk score. The transaction monitor 108 may provide a user interface (UI) to supervisor/administrator 116 who creates the allow list for the users in the organization. For example, the transaction monitor 108 displays icons for each allow list row. Such icons include images and/or text, or any indication of distinctly identifying each allow list candidate. The icon and row associated with each row in the allow list may be moved based on preferences of the supervisor 116. Thus, the allow list candidate on the top of the allow list takes precedence over other allow list candidates.

The transaction monitor 108 may also monitor on-chain transactions from a blockchain endpoint 110. In some examples, transactions which may be created outside the approved wallet 102 are also observed for fraudulent transactions. This is referred to as out-of-bounds compliance checking, and is implemented in some examples using on-chain, real-time, risk analysis. In such examples, addresses are monitored in real-time, outside of the cryptocurrency wallet, to make sure an entity or party is not trying to circumvent the wallet software (e.g., using hacked keys). Thus, examples of the disclosure advantageously save computing resources at least by observing and blocking the transactions created outside the approved wallet 102.

In some examples, the risk score may be calculated by the transaction monitor 108 based on the behavior of the user 114 with a history of transactions and their associated risk scores. The risk score may not be displayed to the user and the wallet may automatically take action on the proposed transaction based on the calculated risk score. For example, if the address of the counterparty is in the allow list and the calculated risk score is unacceptable (e.g., more than a threshold), a decision to continue with the proposed transaction or abort the proposed transaction is taken based on machine learning aspects (e.g., by learning from earlier actions by the user for the address and/or similar risk score) by applying an unsupervised machine learning algorithm. For example, the unsupervised machine learning algorithm is a Long Short-Term Memory (LSTM) network.

In some examples, the machine learning algorithm may be, supervised and/or unsupervised techniques, such as those involving artificial neural networks, association rule learning, recurrent neural networks (RNN), Bayesian networks, clustering, deep learning, decision trees, genetic algorithms, Hidden Markov Modeling (HMM), inductive logic programming, learning automata, learning classifier systems, logistic regressions, linear classifiers, quadratic classifiers, reinforcement learning, representation learning, rule-based machine learning, similarity and metric learning, sparse dictionary learning, support vector machines, and/or the like.

In some embodiments, machine learning aspects implement a sequence neural network for training the interaction model. As an example, the sequence neural network may be trained to output a dense vector representation of transaction data related to a plurality of users. In one use case, with respect to financial transactions between two users, training of the interaction model may rely on a long short-term memory (LSTM) network (or other sequence neural network) to train the interaction model by consuming the real-time graph embedding vectors. Based on the trained interaction model, the LSTM network may predict the action for the displayed risk score.

Figure 2A:
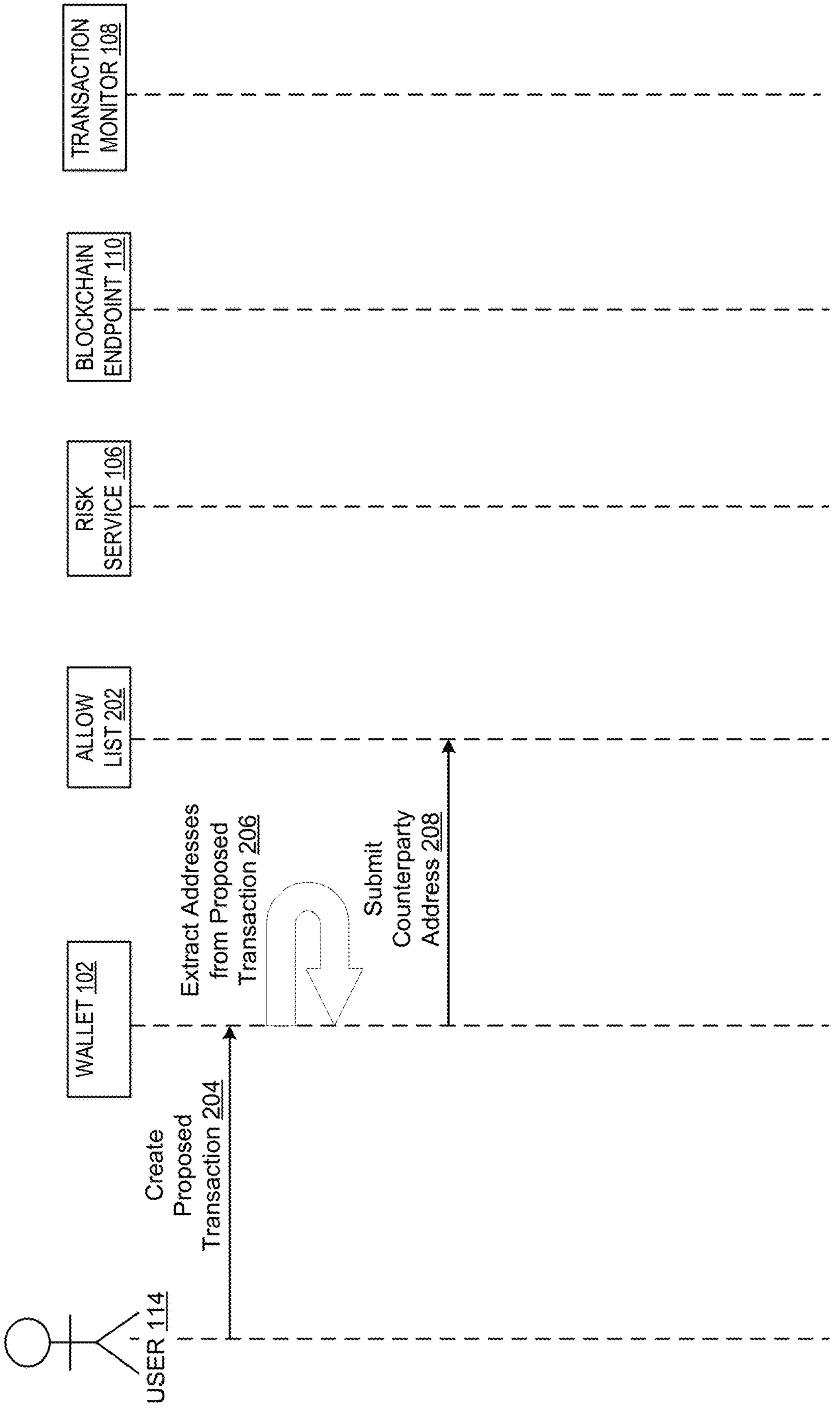
FIGS. 2A-2E show exemplary message sequence diagrams that may occur when using example architectures, such as that of FIG. 1.

FIG. 2A is an exemplary message sequence diagram of messages that may occur when using example architectures, such as that of FIG. 1. For example, at 204, user 114 creates a proposed transaction in the cryptocurrency wallet 102. At 206, the wallet 102 may extract addresses from the proposed transaction. The wallet 102 may submit, at 208, the counterparty addresses that may be extracted from the proposed transaction, to an allow list 202. In some examples, the allow list 202 is created by the supervisor 116 shown in FIG. 1 and the allow list is maintained in the approved environment 112 (e.g., by one or more of the wallet 102, transaction monitor 108, and the risk service 106).

Figure 2B:
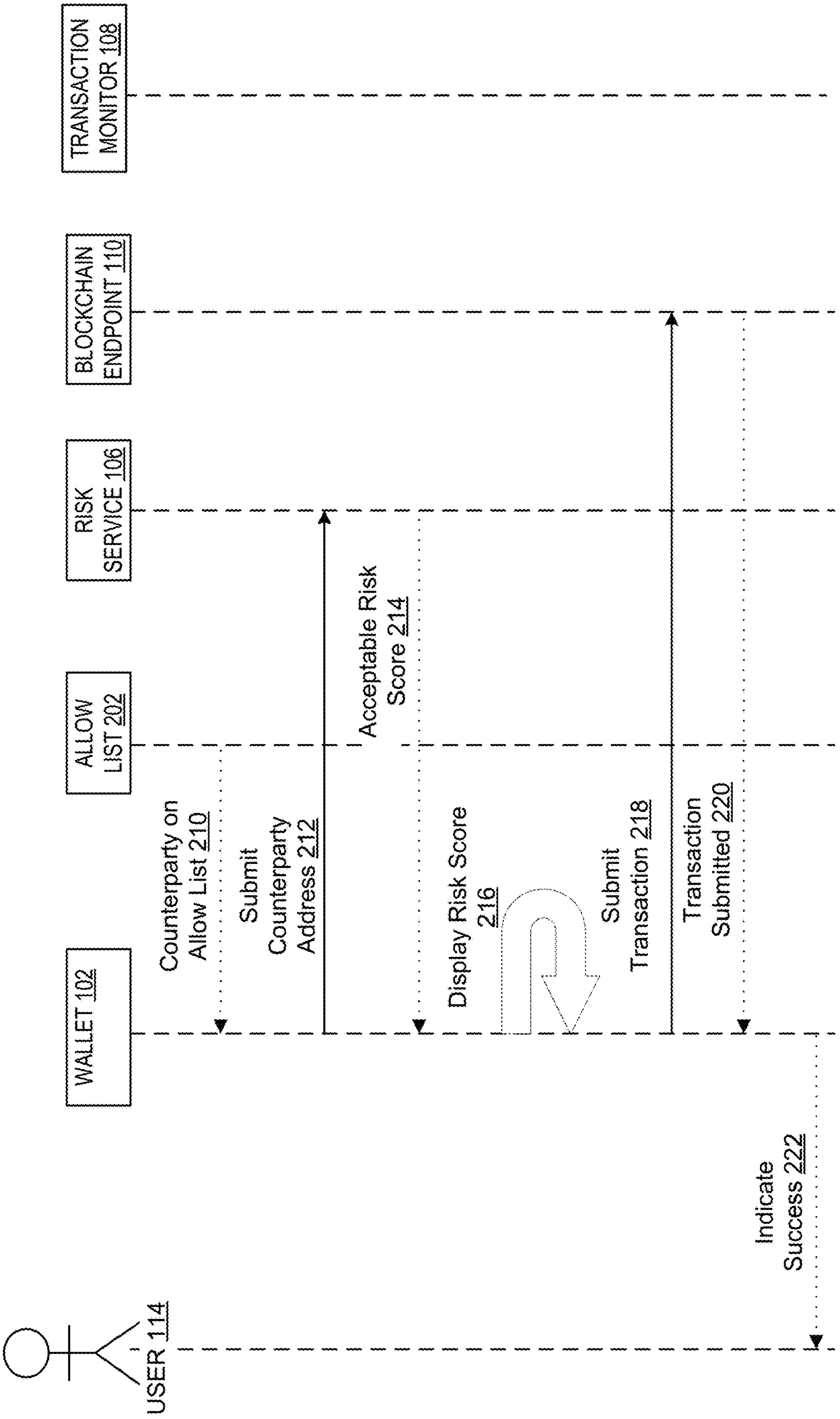

FIG. 2B is an exemplary message sequence diagram of messages that may occur for a transaction with an acceptable counterparty when using example architectures, such as that of FIG. 1. For example, at 210, it is determined that the counterparty is on the allow list. Upon determining that the counterparty is on the allow list, at 212, the counterparty address is submitted to a risk service 106. The risk service 106 returns an acceptable risk score (e.g., a risk score that is less than a threshold, such as less than 4 on a scale of 10) at 214. The wallet 102 displays the risk score at 216 (e.g., the risk score may be displayed to the user 114). The wallet 102 automatically submits the transaction at 218 to the blockchain endpoint 110 because the risk score is acceptable. The blockchain endpoint 110 returns a transaction submitted message to the wallet 102 at 220. The wallet 102 indicates success of the proposed transaction to the user 114 at 222.

Figure 2C:
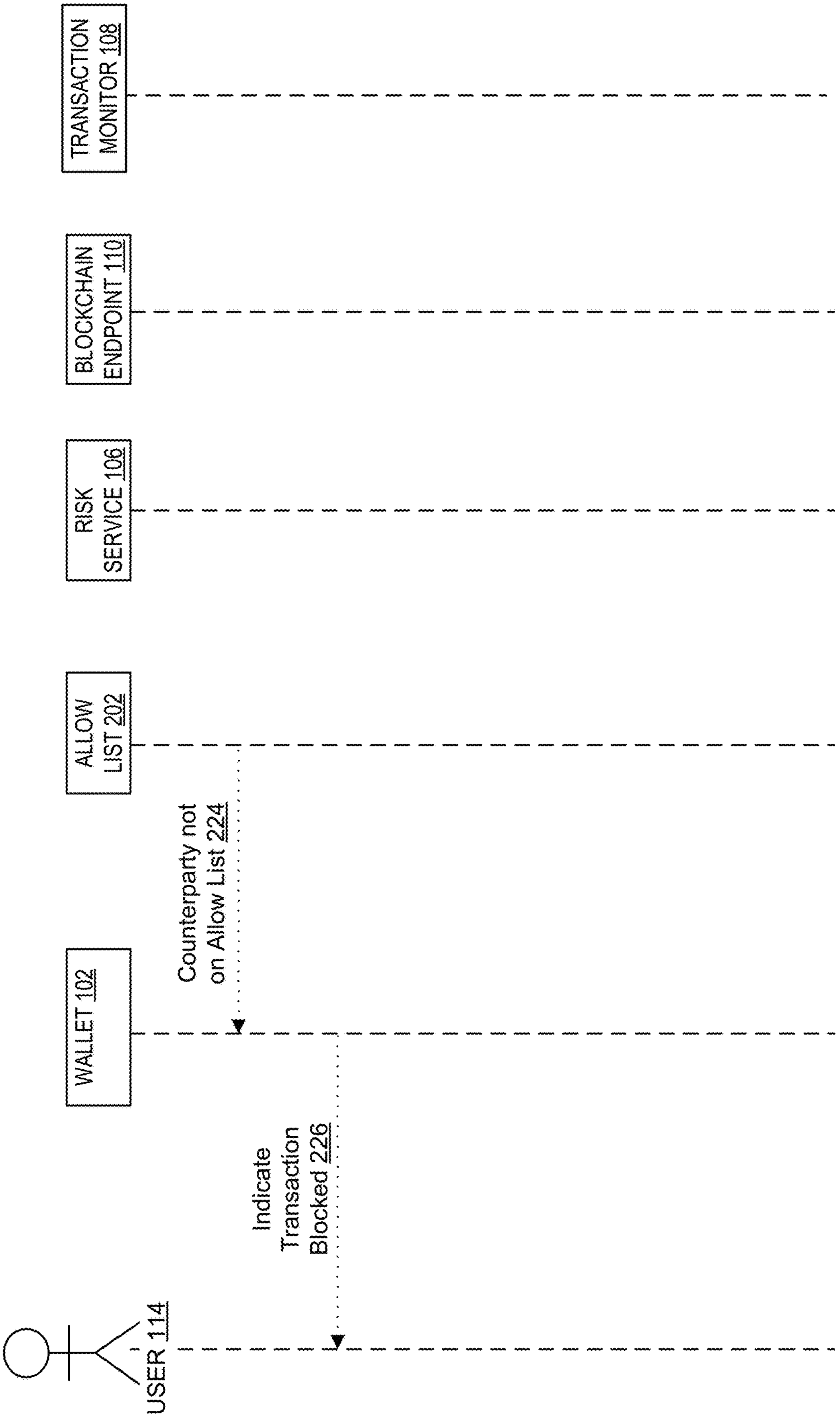

FIG. 2C is an exemplary message sequence diagram of messages that may occur for a transaction with an unacceptable counterparty when using example architectures, such as that of FIG. 1. For example, at 224, it is determined that the counterparty is not on the allow list. Upon determining that the counterparty is not on the allow list, at 226, the wallet 102 indicates to the user 114 that the proposed transaction is blocked.

Figure 2D:
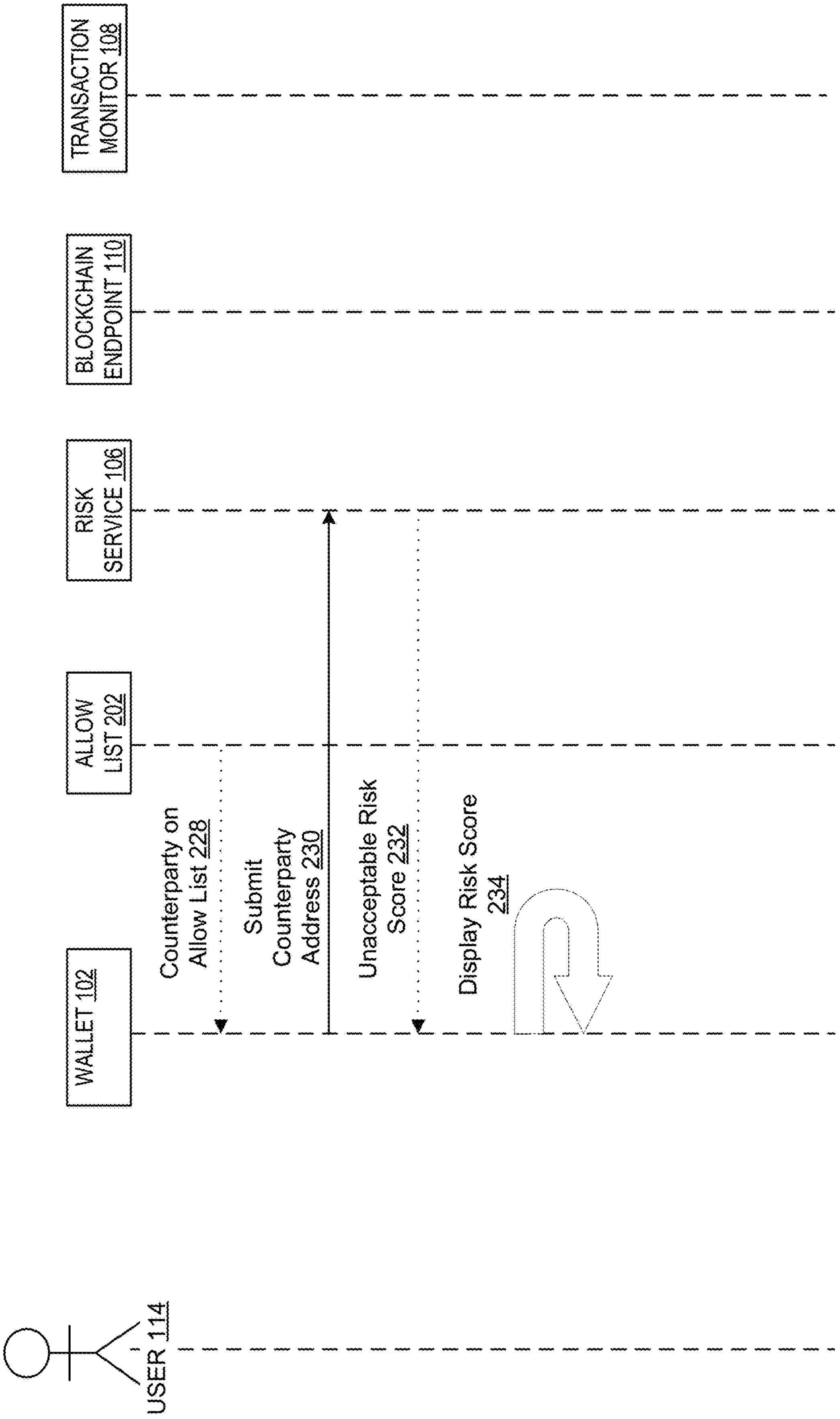

FIG. 2D is an exemplary message sequence diagram of messages that may occur for a transaction with a counterparty on the allow list but having an unacceptable risk score when using example architectures, such as that of FIG. 1. For example, at 228, it is determined that the counterparty is on the allow list. Upon determining that the counterparty is on the allow list, at 230, the counterparty address is submitted to a risk service 106. The risk service 106 returns an unacceptable risk score (e.g., a risk score that is more than a threshold, such as more than 5 on a scale of 10) at 232. The wallet 102 displays the risk score at 234 (e.g., the risk score may be displayed to the user 114).

Figure 2E:
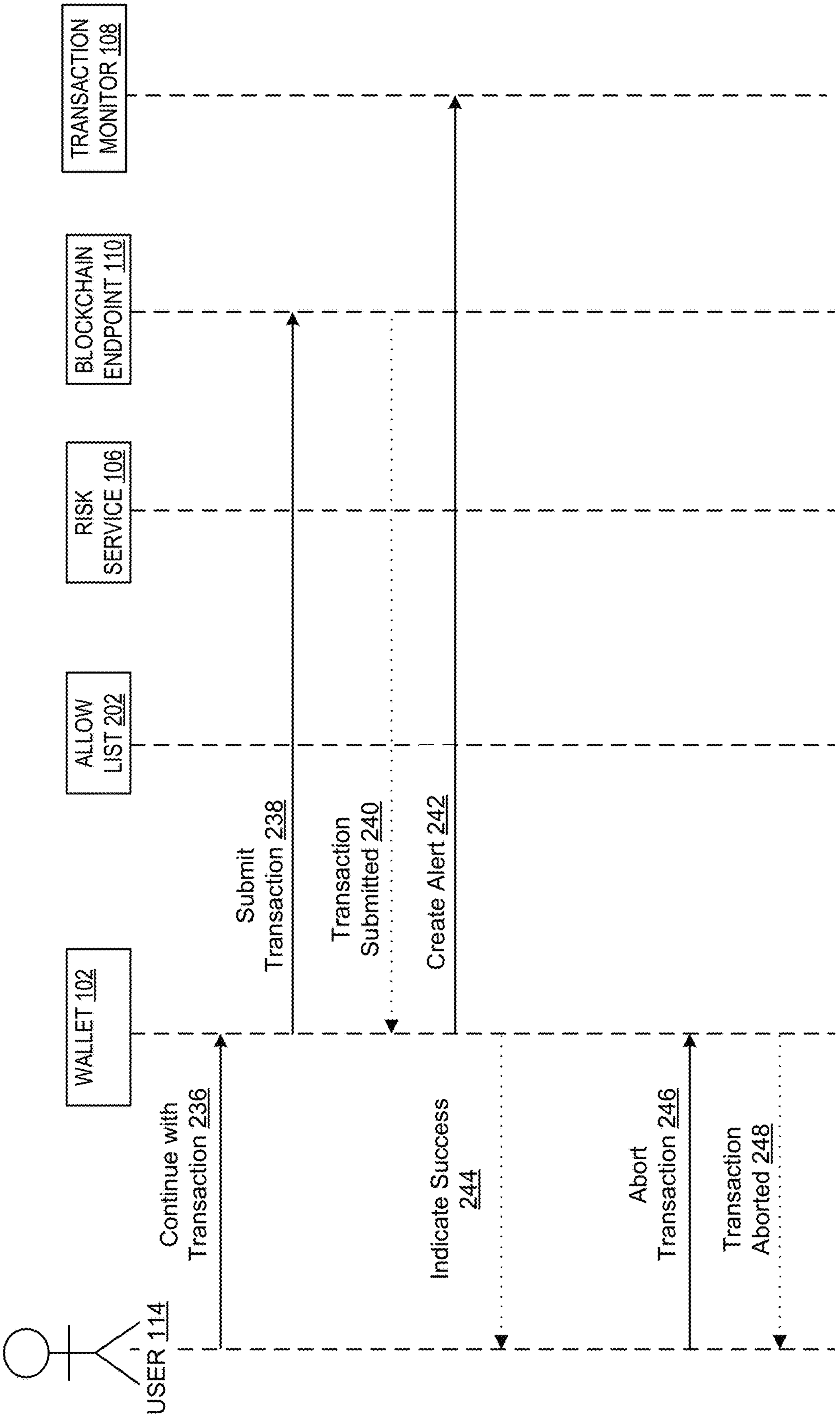

FIG. 2E is an exemplary message sequence diagram of messages that may occur when a user may ignore the displayed risk score or heeds the displayed risk score when using example architectures, such as that of FIG. 1. For example, at 236, the user 114 ignores the displayed risk score and indicates to continue with the proposed transaction. At 238, the wallet 102 submits the proposed transaction to the blockchain endpoint 110 which returns, at 240, a transaction submitted message to the wallet 102. At 242, an alert is created by the wallet 102 and sent to the transaction monitor 108 which provides the alert to the supervisor 116. At 244, the wallet 102 sends an indication of transaction success to the user 114. As another example, the user 114 chooses to heed the displayed risk score and indicates, at 246, to abort the transaction. At 248, the wallet sends a confirmation that the transaction has been aborted.

In some examples, different icons are provided for each alert by the transaction monitor 108 without departing from the description. Such icons include images and/or text, or any other indication distinguishing the alerts. In some examples, the alerts are arranged based on their risk scores. For example, when a high-risk alert is received, the icon and row associated with that alert are automatically moved to the top of the alerts.

Figure 3A:
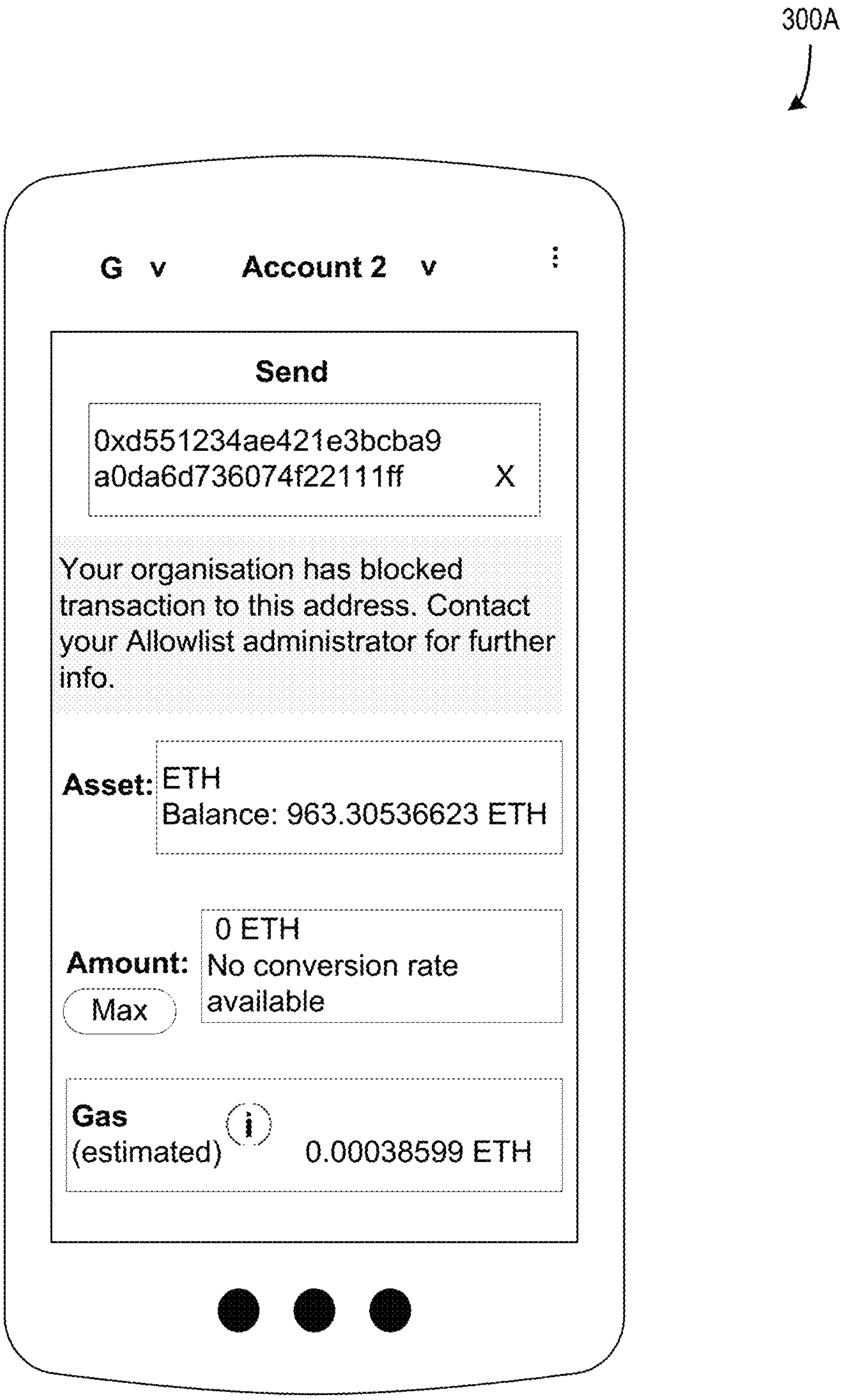
FIG. 3A is an example screenshot showing organization blocking of a transaction.

FIG. 3A is an example screenshot 300A showing organization blocking of a transaction because an address of the counterparty is not in the allow list. FIG. 3B is an example screenshot 300B showing adding of a new allow list by the supervisor 116. The allow list may include fields such as an address, owner name, owner country, owner URL, date and time of adding the address, and a description associated with the address. The description may indicate whether the address and the owner is approved, whether the address is a low risk example, whether the address is a medium risk example, whether the address is a high risk example, or whether the address is a sanctioned example. If the description field is blank for any address that may be evaluated by the user 114. However, if the description field is filled, an automated action may be taken for a transaction matching with the address associated therewith. In some examples, the description field is filled by the user or the description field is automatically filled after a threshold number of actions by the user (e.g., more than 2) for transactions involving the same address.

Figure 3C:
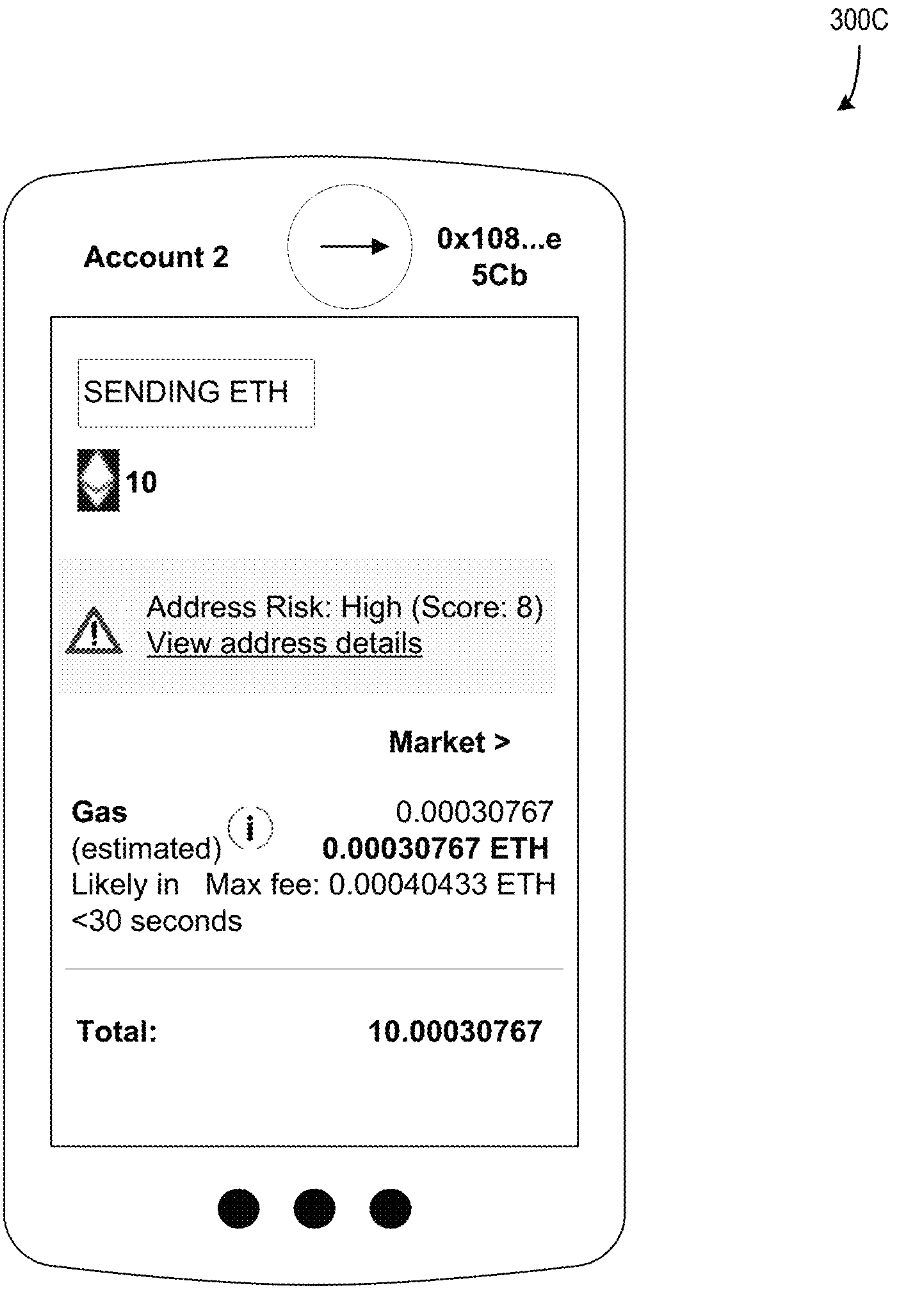
FIG. 3C is an example screenshot showing display of risk score.
Figure 3D:
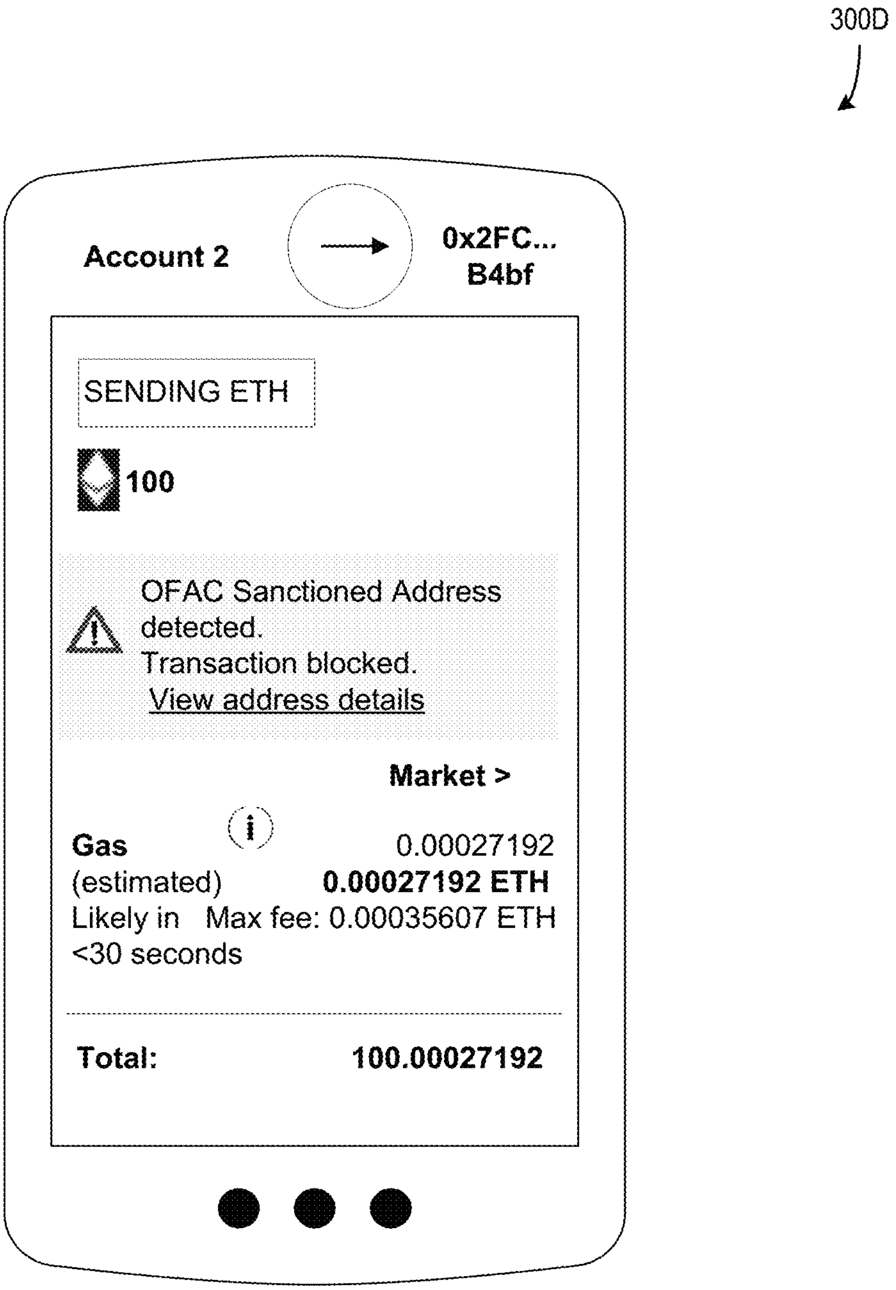
FIG. 3D is an example screenshot showing blocking of a transaction.
Figure 3E:
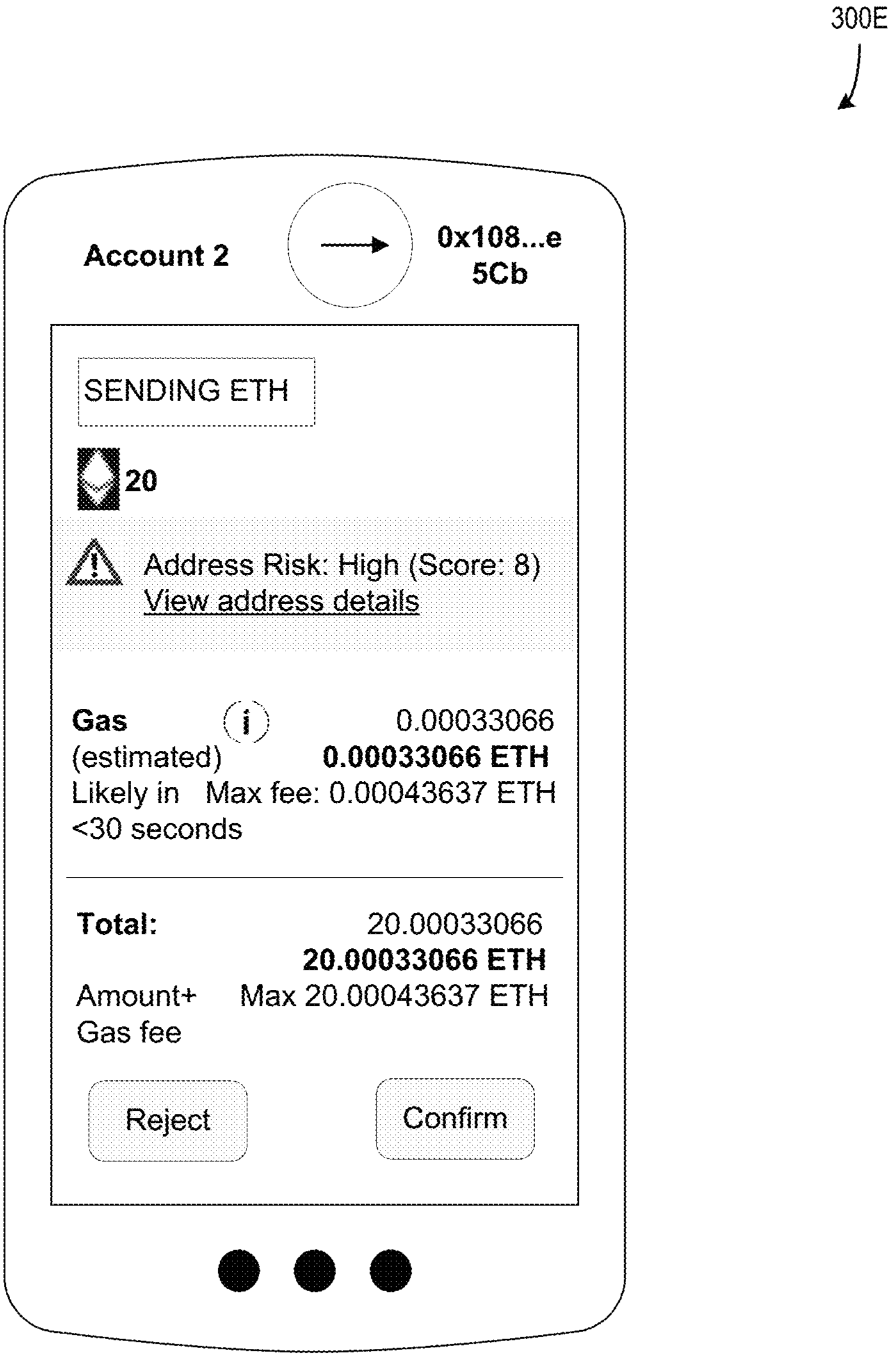
FIG. 3E is an example screenshot showing an alert message for a high risk address.
Figure 3F:
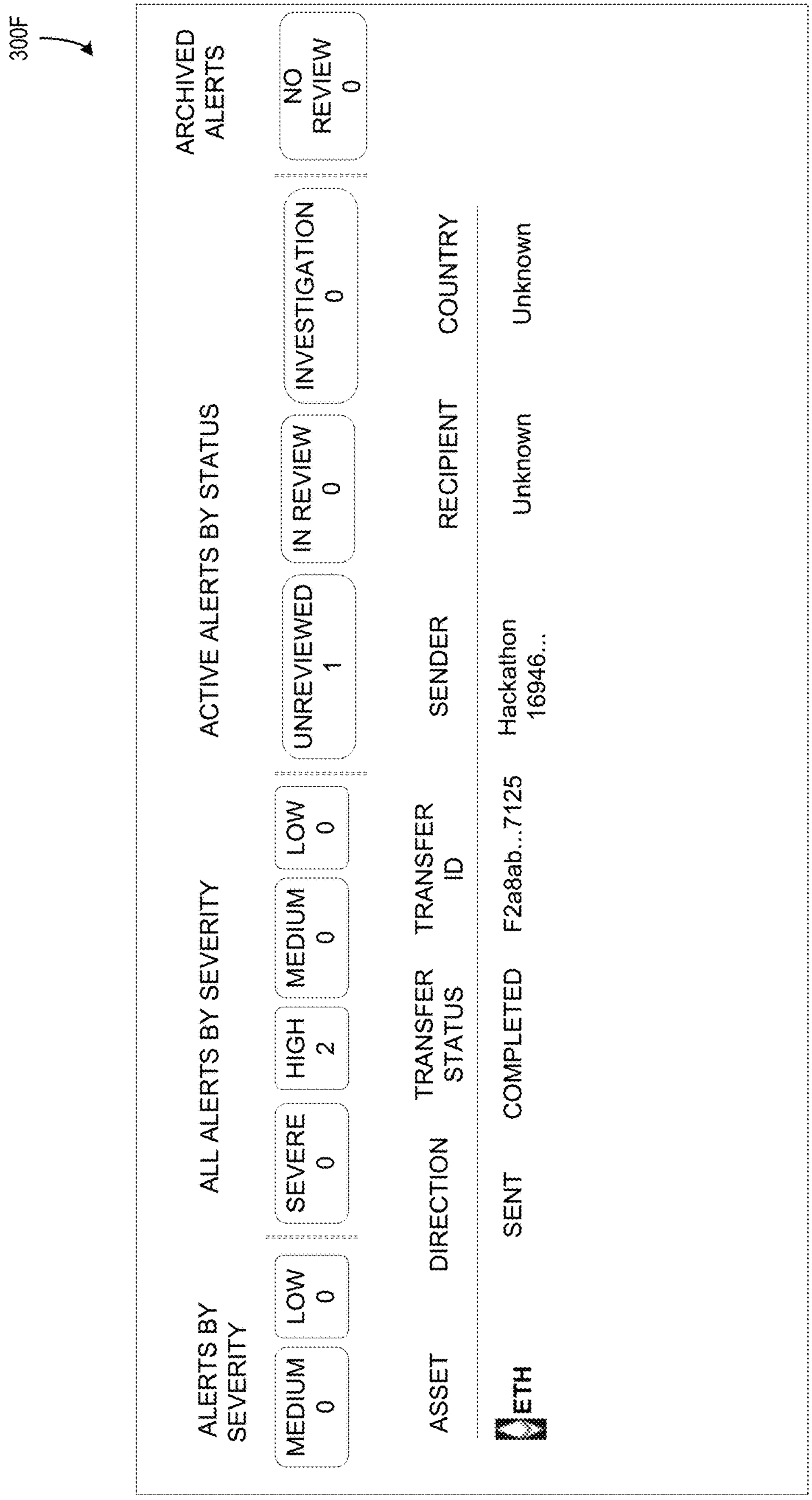
FIG. 3F is an example screenshot showing a dashboard of alerts.

FIG. 3C is an example screenshot 300C showing display of a risk score based on which the user 114 may decide to proceed with the transaction or abort the transaction. FIG. 3D is an example screenshot 300D showing blocking of a transaction because a sanctioned address has been detected for the transaction. FIG. 3E is an example screenshot 300E showing an alert message for a high-risk address for a transaction based on which the user 114 may decide to confirm the transaction or reject the transaction. FIG. 3F is an example screenshot 300F showing a dashboard displaying details of all alerts categorized by severity, active alerts by status, and transfer details of a particular transaction. FIG. 3G is an example screenshot 300G showing transfer details of a completed transaction. In some examples, the screenshot 300G is shown as a pop-up on the dashboard screenshot 300F (e.g., upon selecting the transaction displayed on the dashboard).

Figure 4:
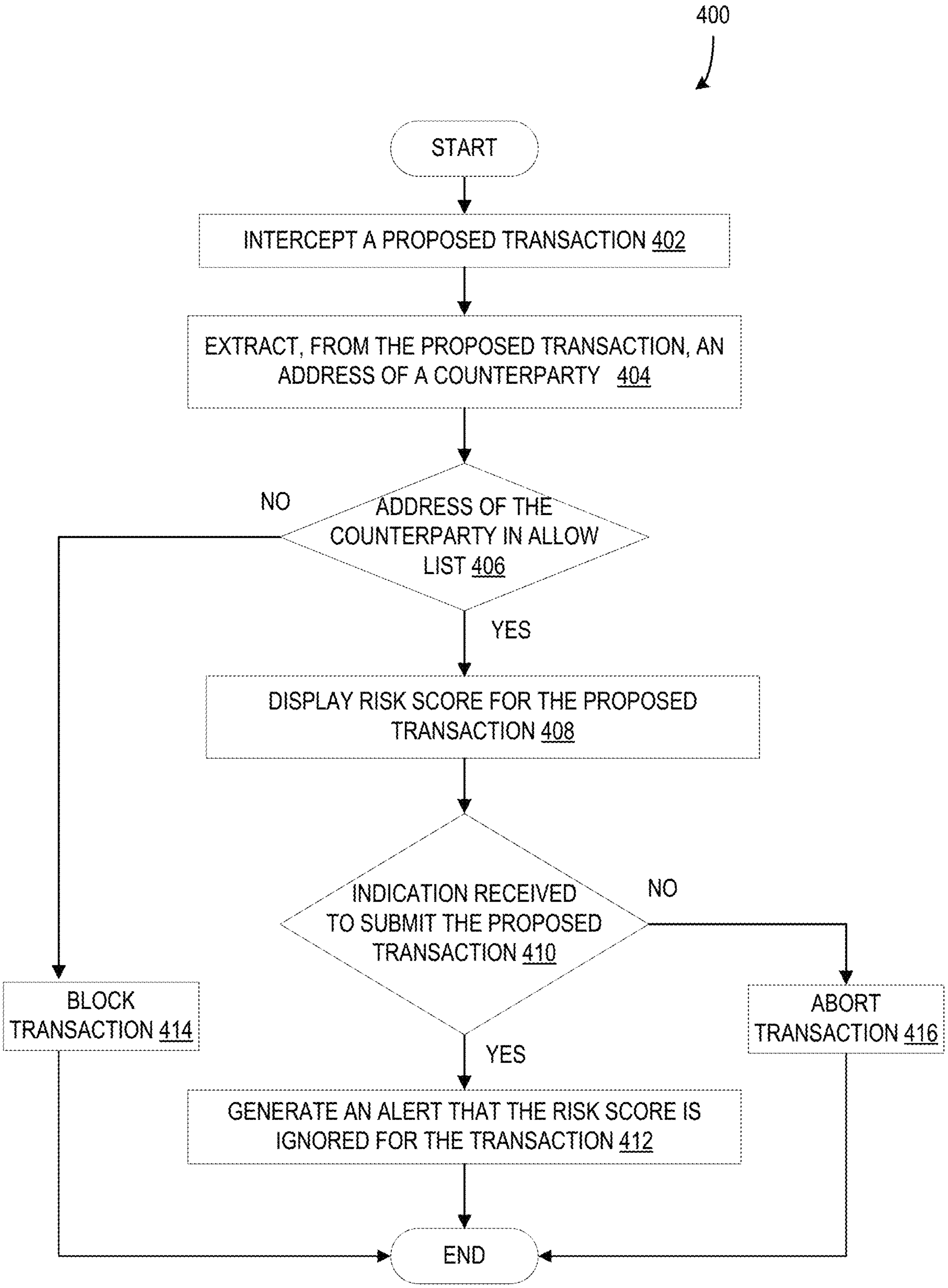
FIG. 4 is a flowchart illustrating an example method for implementing a safer cryptocurrency wallet.

FIG. 4 is a flowchart illustrating an example method 400 for implementing a safer cryptocurrency wallet. At 402, a transaction proposed by a user of a cryptocurrency wallet is intercepted. At 404, an address of counterparty to which a payment is to be made from the cryptocurrency wallet is extracted from the proposed transaction. At 406, the address of the counterparty is compared with the addresses in the allow list and a determination is made whether the address of the counterparty is in the allow list. If it is determined, at 406, that the address of the counterparty is not in the allow list, the proposed transaction is blocked at 414. If it is determined, at 406, that the address of the counterparty is in the allow list, a risk score for the proposed transaction is displayed at 408.

At 410, it is determined whether an indication is received to submit the proposed transaction. If the determination, at 410, is no (e.g., the received indication is to abort the transaction or no indication is received within a threshold time period) the proposed transaction is aborted at 416. If the determination, at 410, is yes then an alert is generated, at 412, that the risk score has been ignored/acknowledged for the transaction. In some examples, the alert is sent to the user and/or to the supervisor. In response to the alert, a response to submit or abort the transaction is received. The received response is used to update the trained interaction model. In some examples, if the response is to submit the proposed transaction, the payment associated with the proposed transaction is processed from the cryptocurrency wallet. If the response is to abort the proposed transaction, the proposed transaction is automatically aborted without the payment associated with the proposed transaction from the cryptocurrency wallet.

Aborting such transactions advantageously preemptively safeguard the cryptocurrency wallet of the user in real-time (e.g., before a proposed transaction is processed) and reduce computing resources requirement that would have been used to process such transactions. In some examples, just because an address of a counterparty, to which a payment is to be made from the cryptocurrency wallet, is in the allow list does not mean that the transaction to such counterparty is not fraudulent. Examples of the disclosure advantageously identify such transactions and advantageously save on the computing resources that would be otherwise wasted on processing such transactions. This improves the technical domain of cryptocurrency wallets by enhancing the security of the cryptocurrency wallets of the users.

Examples of the disclosure operate in an unconventional and advantageous manner by reporting/alerting the user even for the transactions created outside the approved wallet 102. Thus, examples of the disclosure save users from fraud in addition to saving computing resources by processing a limited number of safe transactions and directly blocking the fraud transactions.

In some examples, the functionality of the disclosure may be replicated with the use of a block list of addresses, that the user 114 is prohibited from transacting with, instead of the allow list.

The cryptocurrency wallet 102 may be a self-custody wallet (e.g., a hot wallet) which does not have security tools like organizational allow lists at their disposal. A self-custody wallet (e.g., MetaMask) eliminates a third-party between the user and the crypto assets stored in the wallet. Therefore, self-custody wallets may be prone to address poisoning attacks. Examples of the disclosure overcome the shortcomings of self-custody wallets by incorporating alerting system functionality into the self-custody wallet. The example wallet of the disclosure, with integrated alerting functionality, may be provided to banks and other institutions for their users.

In some examples, the cryptocurrency wallet enables transactions in cryptocurrencies (such as Ethereum), non-fungible tokens (NFTs), and more. The NFTs may be digital trading cards, tickets to an event, in-game items, digital music, art, etc. In some examples, decentralized finance (DeFi) protocols and websites with dApp domain detection functionality are also supported by the cryptocurrency wallet.

Exemplary Operating Environment

Figure 5:
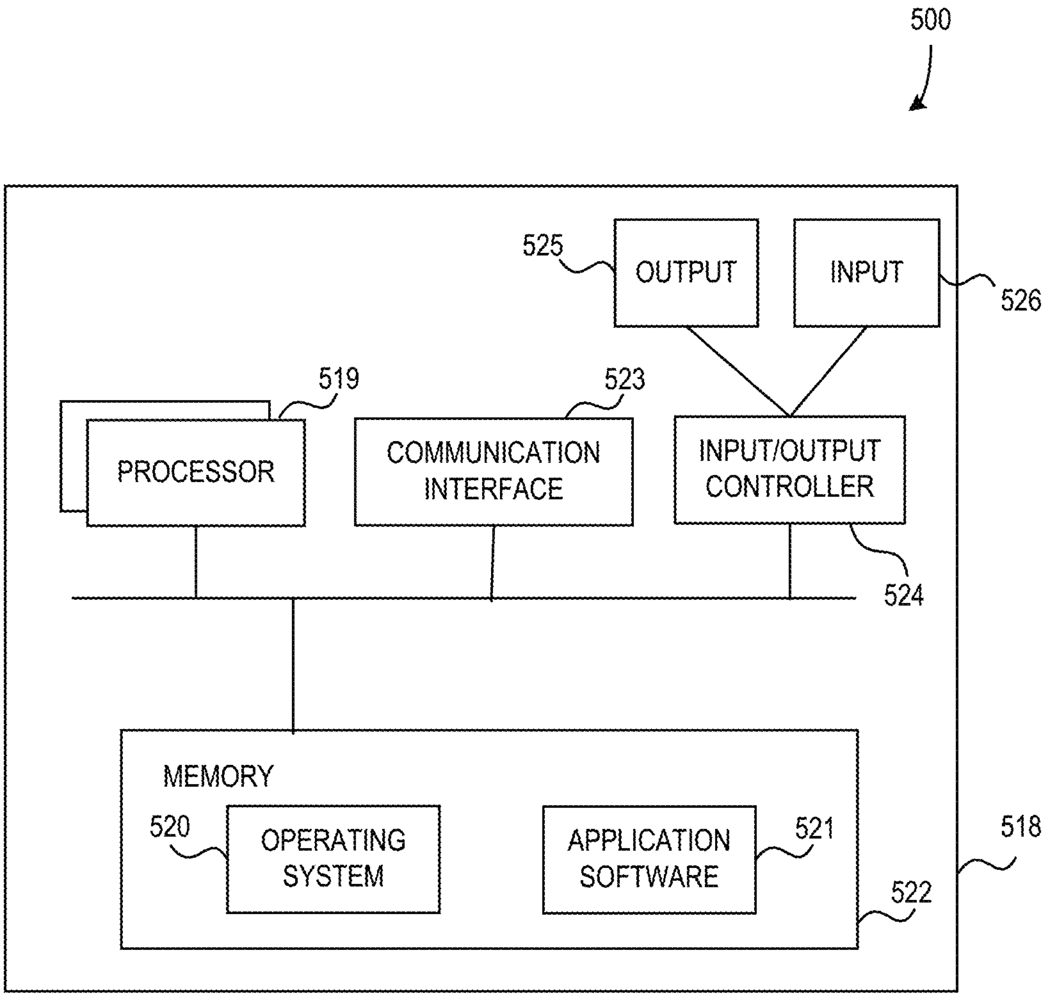
FIG. 5 illustrates an example computing apparatus as a functional block diagram.

The present disclosure is operable with a computing apparatus according to an embodiment as a functional block diagram 500 in FIG. 5. In an example, components of a computing apparatus 518 are implemented as a part of an electronic device according to one or more embodiments described in this specification. The computing apparatus 518 comprises one or more processors 519 which may be microprocessors, controllers, or any other suitable type of processors for processing computer executable instructions to control the operation of the electronic device. Alternatively, or in addition, the processor 519 is any technology capable of executing logic or instructions, such as a hard-coded machine. In some examples, platform software comprising an operating system 520 or any other suitable platform software is provided on the apparatus 518 to enable application software 521 to be executed on the device. In some examples, implementing a safer cryptocurrency wallet is accomplished by software, hardware, and/or firmware.

In some examples, computer executable instructions are provided using any computer-readable media that is accessible by the computing apparatus 518. Computer-readable media include, for example, computer storage media such as a memory 522 and communications media. Computer storage media, such as a memory 522, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium is not a propagating signal. Propagated signals are not examples of computer storage media. Although the computer storage medium (the memory 522) is shown within the computing apparatus 518, it will be appreciated by a person skilled in the art, that, in some examples, the storage is distributed or located remotely and accessed via a network or other communication link (e.g., using a communication interface 523).

Further, in some examples, the computing apparatus 518 comprises an input/output controller 524 configured to output information to one or more output devices 525, for example a display or a speaker, which are separate from or integral to the electronic device. Additionally, or alternatively, the input/output controller 524 is configured to receive and process an input from one or more input devices 526, for example, a keyboard, a microphone, or a touchpad. In one example, the output device 525 also acts as the input device. An example of such a device is a touch sensitive display. The input/output controller 524 may also output data to devices other than the output device, e.g., a locally connected printing device. In some examples, a user provides input to the input device(s) 526 and/or receives output from the output device(s) 525.

The functionality described herein can be performed, at least in part, by one or more hardware logic components.

According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example method secures a cryptocurrency wallet. The computerized method comprises: intercepting a transaction proposed by a user of a cryptocurrency wallet; extracting, from the proposed transaction, an address of a counterparty to which a payment is to be made from the cryptocurrency wallet; comparing the address of the counterparty with a plurality of addresses in an allow list, the plurality of addresses being allowed for transactions using the cryptocurrency wallet; based on the comparison, determining whether the address of the counterparty is in the allow list; upon determining that the address of the counterparty is in the allow list, displaying a risk score for the proposed transaction; in response to displaying the risk score, receiving an indication whether to submit or abort the proposed transaction; upon determining that the indication is to submit the proposed transaction, generating an alert that the risk score is ignored; and upon determining that the indication is to submit the proposed transaction, aborting the proposed transaction.

An example system for securing a cryptocurrency wallet comprises: a processor; and a memory storing instructions that upon execution by the processor cause the processor to: intercept a transaction proposed by a user of a cryptocurrency wallet; extract, from the proposed transaction, an address of a counterparty to which a payment is to be made from the cryptocurrency wallet; compare the address of the counterparty with a plurality of addresses in an allow list, the plurality of addresses representing addresses allowed for transactions using the cryptocurrency wallet; based on the comparison, determine whether the address of the counterparty is in the allow list; upon determining that the address of the counterparty is in the allow list, cause display of a risk score for the proposed transaction; in response to display of the risk score, automatically receive an indication whether to submit or abort the proposed transaction; upon determining that the indication is to submit the proposed transaction, generate an alert, in real-time before the payment associated with the proposed transaction, that the risk score has been acknowledged; and upon determining that the indication is to abort the proposed transaction, automatically abort the proposed transaction.

An example computer storage medium stores instructions that upon execution by a processor cause the processor to: intercept a proposed transaction by a user of a cryptocurrency wallet; extract, from the proposed transaction, an address of a counterparty to which a payment is to be made from the cryptocurrency wallet; compare the address of the counterparty with a plurality of addresses in an allow list, the plurality of addresses representing addresses allowed for transactions using the cryptocurrency wallet; based on the comparison, determine whether the address of the counterparty is in the allow list; upon determining that the address of the counterparty is in the allow list, cause display of a risk score for the proposed transaction; in response to display of the risk score, automatically receive an indication whether to submit or abort the proposed transaction; upon determining that the indication is to submit the proposed transaction, generate an alert, in real-time before the payment associated with the proposed transaction, that the risk score has been acknowledged; and upon determining that the indication is to abort the proposed transaction, automatically abort the proposed transaction.

Alternatively, or in addition to the other examples described herein, examples include any combination of the following:

plugging in a risk attribution application, that includes the allow list, into a cryptocurrency wallet application having the cryptocurrency wallet of the user.

wherein the risk attribution application is provided by a first entity different from a second entity providing the cryptocurrency wallet application.

adding a hook into the cryptocurrency wallet application.

collecting data on interaction history of the user based on a plurality of risk scores, the collected data including an action taken by the user for at least a threshold percentage of the plurality of risk scores;

training an interaction model based on the collected data on the interaction history of the user; and automatically initiating, using the trained interaction model, an action for the displayed risk score, the action comprising automatically receiving the indication to submit or abort the proposed transaction.

upon determining that the address of the counterparty is not in the allow list, blocking the proposed transaction.

wherein determining whether the address of the counterparty is in the allow list comprises determining that the address of the counterparty matches more than a threshold percentage of the plurality of addresses in the allow list that have been used for transactions in past.

wherein the allow list is created by a supervisor of an organization of which the user is a member.

further comprising modifying the cryptocurrency wallet to include a risk attribution application, that includes the allow list wherein the risk attribution application is provided by a first entity different from a second entity providing a cryptocurrency wallet application having the cryptocurrency wallet of the user.

adding the interface into the cryptocurrency wallet application, wherein the interface is an application programming interface.

collecting data on an interaction history of the user based on a plurality of risk scores, the collected data including an action taken by the user for at least a threshold percentage of the plurality of risk scores; training an interaction model based on the collected data on the interaction history of the user; and predicting, using the trained interaction model, an action for the displayed risk score, the action comprising automatically submitting or automatically aborting the proposed transaction.

collect data on an interaction history of the user based on a plurality of risk scores associated with a plurality of transactions, the collected data including an action taken by the user for at least a threshold percentage of the plurality of risk scores; train an interaction model based on the collected data on the interaction history of the user; and predict, using the trained interaction model, an action for the displayed risk score, the action comprising automatically generating the alert or automatically aborting the proposed transaction.

send the alert associated with the proposed transaction to the user; in response to the alert, receive a response to submit or abort the proposed transaction; and update the trained interaction model based on the received response.

upon determining that the response is to submit the proposed transaction, cause the payment associated with the proposed transaction from the cryptocurrency wallet; and upon determining that the response is to abort the proposed transaction, automatically abort the proposed transaction without the payment associated with the proposed transaction from the cryptocurrency wallet.

wherein determining whether the address of the counterparty is in the allow list comprises determining that the address of the counterparty matches more than a threshold percentage of the plurality of addresses in the allow list that have been used for historical transactions before more than a predetermined time period.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for detecting fraud transactions in peer-to-peer payments without an intermediary.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles 'a', 'an', 'the', and 'said' are intended to mean that there are one or more of the elements. The terms 'comprising', including', and 'having' are intended to be inclusive and mean that there may be additional elements other than the listed elements. The term 'exemplary' is intended to mean "an example of." The phrase 'one or more of the following: A, B, and C' means 'at least one of A and/or at least one of B and/or at least one of C.'

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for securing a cryptocurrency wallet, the computerized method comprising:

intercepting, in real time and prior to submission to a blockchain endpoint, using an interface of an approved cryptocurrency wallet of a user, a proposed transaction initiated by the user to an unapproved cryptocurrency wallet;

extracting, from the proposed transaction, an address of a counterparty to which a payment is to be made from the approved cryptocurrency wallet;

performing a fuzzy matching comparison of the address of the counterparty with a plurality of addresses in an allow list, the plurality of addresses representing addresses allowed for transactions using the approved cryptocurrency wallet;

based on the fuzzy matching comparison, determining whether the address of the counterparty matches more than a threshold percentage of at least one of the plurality of addresses in the allow list;

upon determining that the address of the counterparty matches more than the threshold percentage of the at least one of the plurality of addresses in the allow list, transmitting the address of the counterparty to a risk service that performs an on-chain, real-time risk analysis to generate a risk score;

causing display of the risk score for the proposed transaction via a graphical user interface of the approved cryptocurrency wallet;

in response to the display of the risk score, receiving an indication whether to submit or abort the proposed transaction;

upon determining that the indication is to submit the proposed transaction, presenting, by transforming the graphical user interface of the approved cryptocurrency wallet in real-time before the payment associated with the proposed transaction, an alert that the risk score has been acknowledged; and upon determining that the indication is to abort the proposed transaction, aborting the proposed transaction before consumption of blockchain processing resources by the blockchain endpoint.

2. The computerized method of claim 1, further comprising modifying the approved cryptocurrency wallet to include a risk attribution application, that includes the allow list.

3. The computerized method of claim 2, wherein the risk attribution application is provided by a first entity different from a second entity providing a cryptocurrency wallet application having the approved cryptocurrency wallet of the user.

4. The computerized method of claim 3, further comprising:

adding the interface into the cryptocurrency wallet application, wherein the interface is an application programming interface.

5. The computerized method of claim 1, further comprising:

collecting data on an interaction history of the user based on a plurality of risk scores, the collected data including an action taken by the user for at least a threshold percentage of the plurality of risk scores;

training an interaction model based on the collected data on the interaction history of the user; and predicting, using the trained interaction model, an action for the displayed risk score, the action comprising automatically submitting or automatically aborting the proposed transaction.

6. The computerized method of claim 1, further comprising:

upon determining that the address of the counterparty does not match any of the plurality of addresses in the allow list, blocking the proposed transaction.

7. The computerized method of claim 1, wherein the allow list includes addresses that have been used for transactions in the past.

8. The computerized method of claim 1, wherein the allow list is created by a supervisor of an organization of which the user is a member.

9. A system comprising:

a processor; and a memory storing instructions that upon execution by the processor cause the processor to:

intercept, in real time and prior to submission to a blockchain endpoint, using an interface of an approved cryptocurrency wallet, a proposed transaction initiated by a user to an unapproved cryptocurrency wallet;

extract, from the proposed transaction, an address of a counterparty to which a payment is to be made from the approved cryptocurrency wallet;

perform a fuzzy matching comparison of the address of the counterparty with a plurality of addresses in an allow list, the plurality of addresses representing addresses allowed for transactions using the approved cryptocurrency wallet;

based on the fuzzy matching comparison, determine whether the address of the counterparty matches more than a threshold percentage of at least one of the plurality of addresses in the allow list;

upon determining that the address of the counterparty matches more than the threshold percentage of the at least one of the plurality of addresses in the allow list, transmit the address of the counterparty to a risk service that performs an on-chain, real-time risk analysis to generate a risk score;

cause display of the risk score for the proposed transaction via a graphical user interface of the approved cryptocurrency wallet;

in response to the display of the risk score, automatically receive an indication whether to submit or abort the proposed transaction;

upon determining that the indication is to submit the proposed transaction, present, by transforming the graphical user interface of the approved cryptocurrency wallet, an alert, in real-time before the payment associated with the proposed transaction, that the risk score has been acknowledged; and upon determining that the indication is to abort the proposed transaction, automatically abort the proposed transaction without consumption of blockchain processing resources by the blockchain endpoint.

10. The system of claim 9, wherein the instructions upon execution by the processor further cause the processor to:

collect data on an interaction history of the user based on a plurality of risk scores associated with a plurality of transactions, the collected data including an action taken by the user for at least a threshold percentage of the plurality of risk scores;

train an interaction model based on the collected data on the interaction history of the user; and predict, using the trained interaction model, an action for the displayed risk score, the action comprising automatically generating the alert or automatically aborting the proposed transaction.

11. The system of claim 10, wherein the instructions upon execution by the processor further cause the processor to:

send the alert associated with the proposed transaction to the user;

in response to the alert, receive a response to submit or abort the proposed transaction; and update the trained interaction model based on the received response.

12. The system of claim 11, wherein the instructions upon execution by the processor further cause the processor to:

upon determining that the response is to submit the proposed transaction, cause the payment associated with the proposed transaction from the approved cryptocurrency wallet; and upon determining that the response is to abort the proposed transaction, automatically abort the proposed transaction without the payment associated with the proposed transaction from the approved cryptocurrency wallet.

13. The system of claim 9, wherein the instructions upon execution by the processor further cause the processor to:

upon determining that the address of the counterparty does not match any of the plurality of addresses in the allow list, block the proposed transaction.

14. The system of claim 9, wherein the allow list includes addresses that have been used for transactions in the past.

15. A computer storage medium storing instructions that upon execution by a processor cause the processor to:

intercept, in real time and prior to submission to a blockchain endpoint, using an interface of an approved cryptocurrency wallet, a proposed transaction initiated by a user to an unapproved cryptocurrency wallet;

extract, from the proposed transaction, an address of a counterparty to which a payment is to be made from the approved cryptocurrency wallet;

perform a fuzzy matching comparison of the address of the counterparty with a plurality of addresses in an allow list, the plurality of addresses representing addresses allowed for transactions using the approved cryptocurrency wallet;

based on the fuzzy matching comparison, determine whether the address of the counterparty matches more than a threshold percentage of at least one of the plurality of addresses in the allow list;

upon determining that the address of the counterparty matches more than the threshold percentage of the at least one of the plurality of addresses in the allow list, transmit the address of the counterparty to a risk service that performs an on-chain, real-time risk analysis to generate a risk score;

cause display of the risk score for the proposed transaction via a graphical user interface of the approved cryptocurrency wallet;

in response to the display of the risk score, automatically receive an indication whether to submit or abort the proposed transaction;

upon determining that the indication is to submit the proposed transaction, present, by transforming the graphical user interface of the approved cryptocurrency wallet, an alert, in real-time before the payment associated with the proposed transaction, that the risk score has been acknowledged; and upon determining that the indication is to abort the proposed transaction, automatically abort the proposed transaction without consumption of blockchain processing resources by the blockchain endpoint.

16. The computer storage medium of claim 15, wherein the instructions upon execution by the processor further cause the processor to:

collect data on an interaction history of the user based on a plurality of risk scores associated with a plurality of transactions, the collected data including an action taken by the user for at least a threshold percentage of the plurality of risk scores;

train an interaction model based on the collected data on the interaction history of the user; and predict, using the trained interaction model, an action for the displayed risk score, the action comprising automatically generating the alert or automatically aborting the proposed transaction.

17. The computer storage medium of claim 16, wherein the instructions upon execution by the processor further cause the processor to:

send the alert associated with the proposed transaction to the user;

in response to the alert, receive a response to submit or abort the proposed transaction; and update the trained interaction model based on the received response.

18. The computer storage medium of claim 17, wherein the instructions upon execution by the processor further cause the processor to:

upon determining that the response is to submit the proposed transaction, cause the payment associated with the proposed transaction from the approved cryptocurrency wallet; and upon determining that the response is to abort the proposed transaction, automatically abort the proposed transaction without the payment associated with the proposed transaction from the approved cryptocurrency wallet.

19. The computer storage medium of claim 15, wherein the instructions upon execution by the processor further cause the processor to:

present a plurality of icons associated with a plurality of alerts for a plurality of proposed transactions, the plurality of icons being arranged based on risk scores associated with the plurality of alerts; and automatically rearrange the plurality of icons by including an icon associated with the alert for the proposed transaction, the rearrangement of the plurality of icons including the icon being based on the risk scores including the risk score associated with the alert.

20. The computer storage medium of claim 15, wherein the plurality of addresses in the allow list includes addresses that have been used for historical transactions before more than a predetermined time period.

* * * * *